(12) United States Patent
Narayanan et al.

(10) Patent No.: US 11,336,318 B2
(45) Date of Patent: May 17, 2022

(54) TRANSCEIVER DEVICE PORT CONFIGURATION AND MONITORING SYSTEM

(71) Applicant: Dell Products L.P., Round Rock, TX (US)

(72) Inventors: Padmanabhan Narayanan, Redmond, WA (US); Mohamed Hanif Kader Shiek Usman, Kadayanallur (IN); Sridhar Mahadevan, Chennai (IN)

(73) Assignee: Dell Products L.P., Round Rock, TX (US)

( * ) Notice: Subject to any disclaimer, the term of this patent is extended or adjusted under 35 U.S.C. 154(b) by 54 days.

(21) Appl. No.: 16/742,078

(22) Filed: Jan. 14, 2020

(65) Prior Publication Data
US 2021/0218431 A1 Jul. 15, 2021

(51) Int. Cl.
| | | |
|---|---|---|
| H04B 1/38 | (2015.01) | |
| H04B 1/3818 | (2015.01) | |
| H04W 80/10 | (2009.01) | |
| H04W 24/08 | (2009.01) | |

(52) U.S. Cl.
CPC .......... *H04B 1/3818* (2015.01); *H04W 24/08* (2013.01); *H04W 80/10* (2013.01)

(58) Field of Classification Search
CPC .... H04B 1/3818; H04B 17/12; H04B 7/0617; H04B 1/48; H04B 17/309; H04B 7/0695; H04W 24/08; H04W 80/10; H04W 84/12; H04W 12/50; H04W 16/28; H04W 76/10; H04W 76/12; H04W 8/005; H04W 24/10; H04W 24/02; H04W 84/18; H04W 40/248
See application file for complete search history.

(56) References Cited

U.S. PATENT DOCUMENTS

| | | | | |
|---|---|---|---|---|
| 2002/0165023 | A1* | 11/2002 | Brosnan ................ | H04L 69/329 463/29 |
| 2012/0051000 | A1* | 3/2012 | Laidig .................... | H01Q 23/00 361/736 |
| 2014/0140435 | A1* | 5/2014 | Zhang .................. | H04B 7/0691 375/295 |
| 2016/0378630 | A1* | 12/2016 | Narayanan ............ | G06F 11/324 710/18 |

(Continued)

*Primary Examiner* — Fred A Casca
(74) *Attorney, Agent, or Firm* — Joseph Mencher (57) ABSTRACT

A transceiver device port configuration and monitoring system includes a networking device having a networking device wireless communication system, a port, and a wireless identification system associated with the port. A transceiver device is connected to the port and includes a wireless reader system that retrieves a port identifier for the port from the wireless identification system, and a transceiver device wireless communication system that the transceiver device uses to wirelessly advertise the connection of the transceiver device to the port. In response to receiving the wireless advertisement of the connection of the transceiver device to the port, the networking device uses the networking device wireless communication system to establish a wireless session with the transceiver device, retrieves configuration information from the transceiver device via the wireless session, uses the configuration information to configure the port for operation with the transceiver device, and monitors the port.

20 Claims, 10 Drawing Sheets

(56) References Cited

U.S. PATENT DOCUMENTS

| | | | |
|---|---|---|---|
| 2017/0222546 A1* | 8/2017 | Netsu | H01R 31/065 |
| 2019/0146075 A1* | 5/2019 | Kravets | G01S 7/006 |
| | | | 455/67.11 |
| 2019/0280514 A1* | 9/2019 | Ramirez Lluvias | H02J 7/008 |

* cited by examiner

TRANSCEIVER DEVICE PORT CONFIGURATION AND MONITORING SYSTEM

BACKGROUND

The present disclosure relates generally to information handling systems, and more particularly to configuring and monitoring ports on information handling systems that are connected to transceiver devices.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and/or other networking devices known in the art, are sometimes connected to transceiver devices that operate to transmit data between the networking devices and other computing devices coupled to the transceiver devices. There are a variety of different types of transceiver devices (e.g., copper-based transceiver devices, optical-based transceiver devices, etc.) capable of a variety of different transmission speeds (e.g., 1 Gigabit per second (Gbps) and up to 400 Gpbs in future switch devices) that provide users of the switch devices with a wide range of options for configuring the ports that connect the transceiver devices to the switch device, and one of skill in the art in possession of the present disclosure will appreciate that the capital expenditure on transceiver devices is typically several times that of the switch devices themselves. However, the configuration of ports to which the transceiver devices are connected so that they may operate with the switch device can raise some issues.

For example, when a transceiver device is connected to a port on a switch device, a host networking operating system provided by a System on Chip (SoC) in the Central Processing Unit (CPU) of the switch device (or a Baseboard Management Controller (BMC) or Field Programmable Gate Array (FPGA) in the switch device) will detect the transceiver device (e.g., via a plug-in event, typically through an FPGA register polling interrupt mechanism based on a "ModPrsL" signal), and attempt to access an Electronically Erasable Programmable Read Only Memory (EERPOM) in the transceiver device using an Inter-Integrated Circuit ($I_2C$) controller that may be instantiated by the CPU SoC, the BMC, or an FPGA in order to read information from the EEPROM for use in setting the port-based properties (e.g., Forward Error Correction (FEC) port-based properties) of the port connected to that transceiver device. Furthermore, the host networking operating system may also read and/or set other I2C slave subsystems in the transceiver device such as the Digital Diagnostics Monitoring Interface (DDMI) and internal PHYsical interfaces (PHYs) in the transceiver device. Conventional $I_2C$ interfaces between the CPU SoC/BMC/FPGA and transceiver devices are typically provided as multiplexer trees with each of the transceiver devices operating as a leaf, and with several transceiver devices sharing a common multiplexer path to the $I_2C$ root of the multiplexer tree.

However, in the event a faulty or incompatible/unqualified transceiver device is connected to the switch device, the $I_2C$ controller will "hang" such that no more transactions may be made by the $I_2C$ controller, and other transceiver devices connected to the same multiplexer tree as that faulty/incompatible/unqualified transceiver device will become available as well due to the $I_2C$ controller being unable to proceed past the faulty/incompatible/unqualified transceiver device (e.g., a "bad" $I_2C$ endpoint) during the port configuration operations. Furthermore, in some cases, an $I_2C$ multiplexer tree can become unavailable, making all of the transceiver devices connected to that multiplexer tree unavailable. In faulty/incompatible/unqualified transceiver device situations, the faulty/incompatible/unqualified transceiver device must be identified and removed from the switch device, which is a time consuming and manual process, and the $I_2C$ controller may need to be reinitialized to repeat the transceiver device port configuration process (which can require a networking operating system reboot.) As such, conventional transceiver device port configuration in the event a faulty/incompatible/unqualified transceiver device is connected to the switch device can greatly extend the amount of time needed to initialize a switch device to perform runtime operations.

Accordingly, it would be desirable to provide a transceiver device port configuration and monitoring system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a controller engine that is configured to: receive, via a wireless communication system from a transceiver device, a wireless advertisement of a connection of the transceiver device to a port that is coupled to the processing system; use, in response to receiving the wireless advertisement of the connection of the transceiver device to the port that is coupled to the processing system, the wireless communication system to establish a wireless session with the transceiver device; retrieve, via the wireless session, configuration information from the transceiver device; and configure, using the configuration information, the port for operation with the transceiver device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
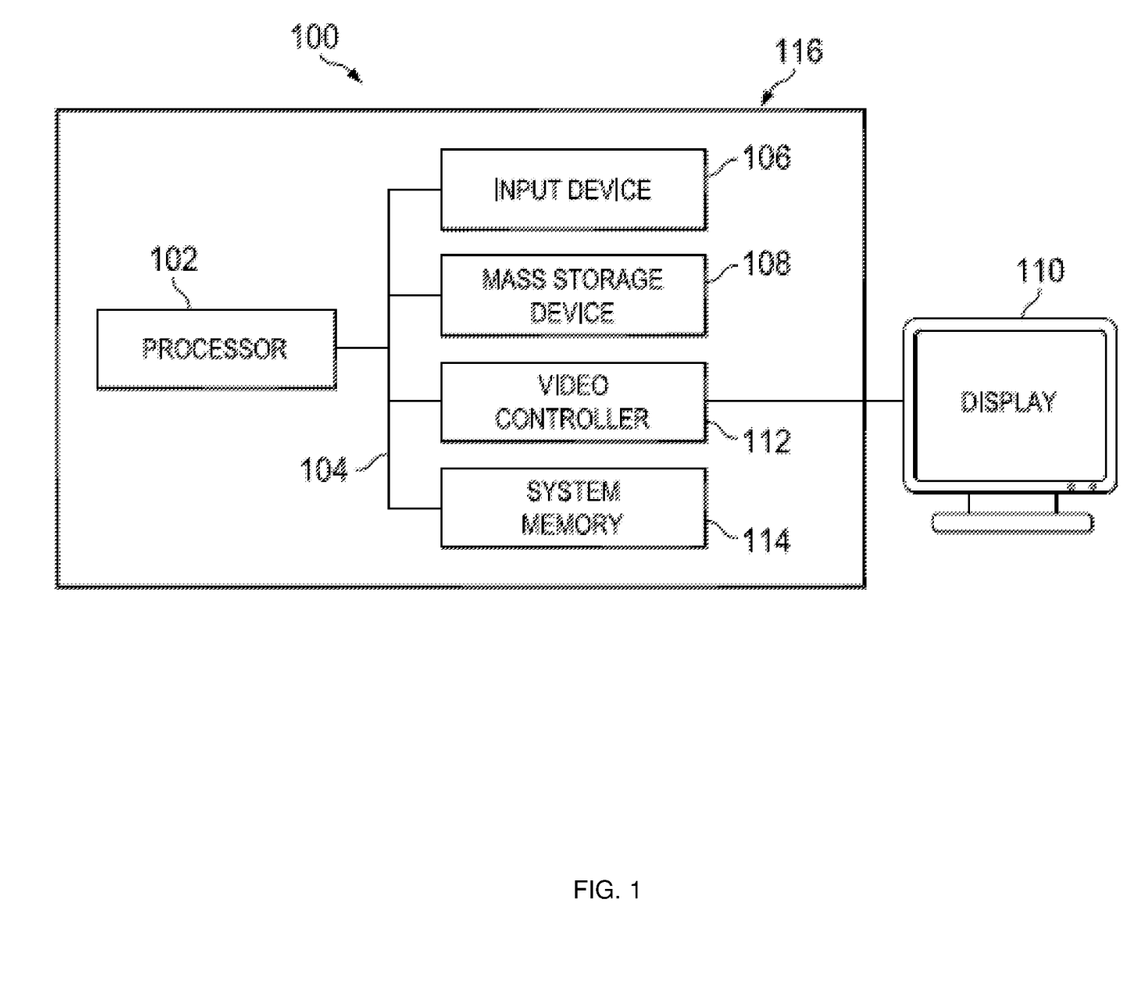
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
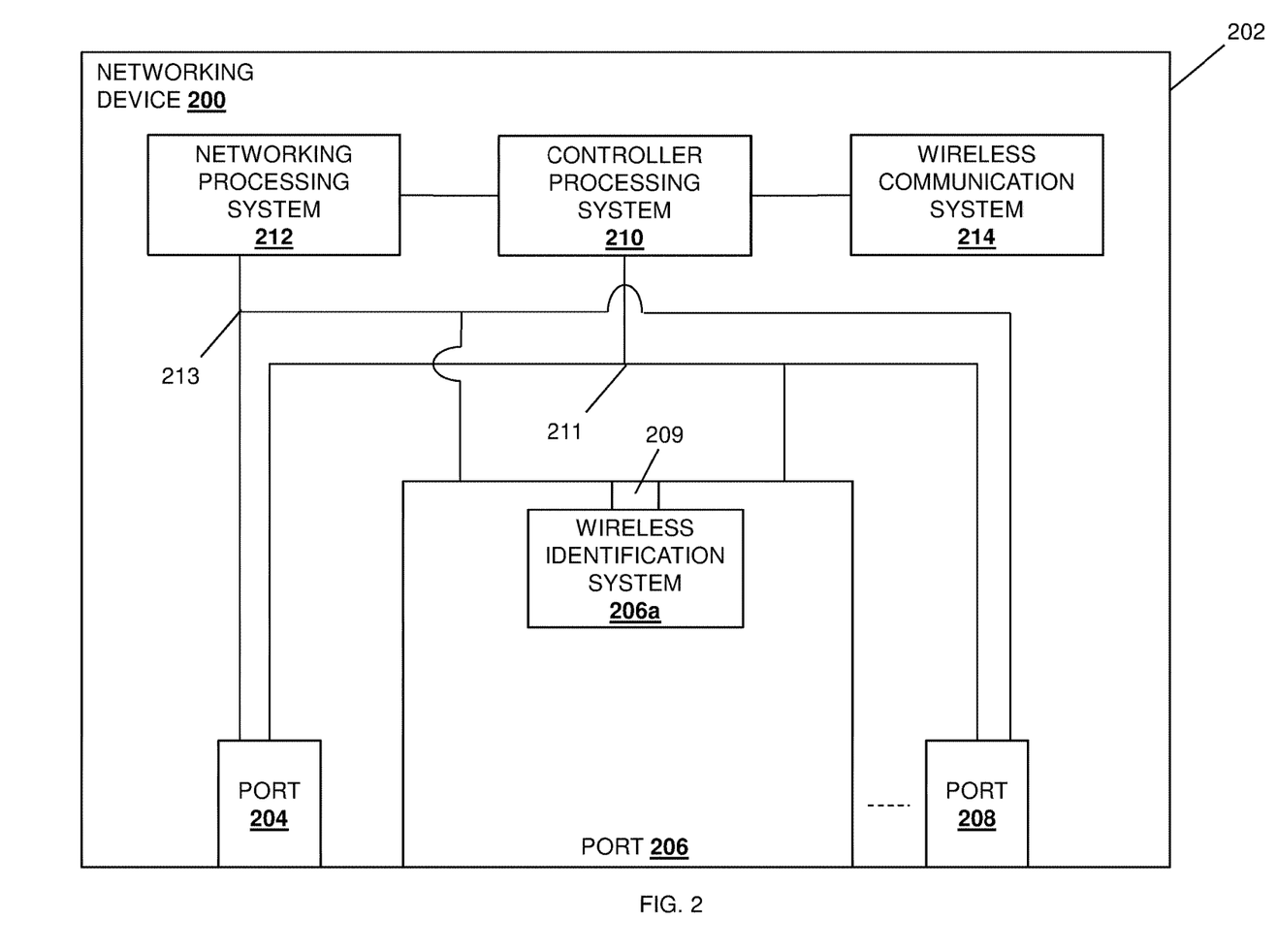
FIG. 2 is a schematic view illustrating an embodiment of a networking device that may be provided in the transceiver device port configuration and monitoring system of the of the present disclosure.

Referring now to FIG. 2, an embodiment of a transceiver device port configuration and monitoring system provided according to the teachings of the present disclosure is illustrated. In the illustrated embodiment, the transceiver device port configuration and monitoring system includes a networking device 200. In an embodiment, the networking device 200 may be provided by the IHS 100 discussed above with reference to FIG. 1, and/or may include some or all of the components of the IHS 100, and in a specific example may be provided by a switch device. However, while illustrated and discussed as a switch device, one of skill in the art in possession of the present disclosure will recognize that networking devices provided in the transceiver device port configuration and monitoring system may include any devices that may be configured to operate similarly as the networking device 200 discussed below. The networking device 200 may include a chassis 202 that houses the components of the networking devices 200, only some of which are illustrated in FIG. 2. For example, the chassis 202 may include a plurality of ports 204, 206, and up to 208 that are each configured to connect to a transceiver device and, as such, each of the ports 204-208 may be configured to operate with copper-based transceiver devices, optical-based transceiver devices, or other types of transceiver devices, and may each include a transceiver "cage" or other physical connecting subsystem that is configured to connect and secure a transceiver device to the networking device 200.

In the illustrated embodiment, the port 206 is illustrated as including a wireless identification system 206a. For example, the wireless identification system 206a may be provided by a Radio Frequency IDentifier (RFID) (e.g., a passive RFID), although one of skill in the art in possession of the present disclosure will appreciate that other wireless identification systems may be utilized while remaining within the scope of the present disclosure as well. As illustrated, the wireless identification system 206a may be mechanically connected to the port 206/transceiver "cage"/networking device 200 by a mechanical connection 209. For example, the mechanical connection 209 may be any type of connection that one of skill in the art in possession of the present disclosure would recognize as being sufficient to attached, couple, or otherwise connected an RFID to a port or transceiver "cage", and in many embodiments may include a release mechanism that allows the wireless identification system 206a/RFID to be released from the port 206/networking device 200. As such, the mechanical connection 209/release mechanism may provide for easy and quick replacement of the wireless identification system 206a/RFID in the event the RFID becomes damaged, inoperable, and/or otherwise in need of replacement. While only the port 206 is illustrated as including the wireless identification system 206a, one of skill in the art in possession of the present disclosure will appreciate that the ports 204 and up to 208 may be substantially similar to the port 206, and thus may include similar wireless identification systems and operate in a manner similar to that discussed below for the port 206 while remaining within the scope of the present disclosure as well.

In the illustrated embodiment, the chassis 202 also houses a controller processing system 210. For example, the controller processing system 210 may be provided by a System on Chip (SoC) in a Central Processing Unit (CPU) included in the networking device 200; a Baseboard Management Controller (BMC) (e.g., that is coupled to a CPU in the networking device 200 via a Peripheral Component Interconnect express (PCIe) interface) such as the integrated DELL® Remote Access Controller (iDRAC) available DELL® Inc. of Round Rock, Tex., United States; a Field Programmable Gate Array (FPGA); and/or other controller processing systems that would be apparent to one of skill in the art in possession of the present disclosure. In some embodiments, the controller processing system 210 may be coupled to a controller memory system (not illustrated) that includes instructions that, when executed by the controller processing system 210, cause the controller processing system to provide a controller engine that is configured to perform the functions of the controller engines and/or controller processing systems discussed below.

In the illustrated embodiment, the controller processing system 210 is coupled to each of the ports 204-208 via control couplings 211 that, as discussed below, are configured to transmit, receive, and/or otherwise exchange control signals such as, for example, Low Power Mode (LPMode) control signals, Module Present (ModPrsL) control signals, Power (Vcc) control signals, Module Select (ModSelL) signals, Reset (ResetL) signals, and/or other control signals that would be apparent to one of skill in the art in possession of the present disclosure. However, as will be noted by one of skill in the art in possession of the present disclosure, the networking device 200 may be free of the conventional $I_2C$ interfaces/connections and, in particular, the conventional $I_2C$ multiplexer tree interfaces that are conventionally provided between controller processing systems and ports in conventional switch devices. As such, the systems and methods of the present disclosure may allow for reduced complexity circuit boards in the networking device 200 by eliminating the need for the $I_2C$ traces and/or other connections used with such conventional systems.

In the illustrated embodiment, the chassis 202 also houses a networking processing system 212 that is coupled to the controller processing system 210. For example, the networking processing system 212 may be provided by a Network Processing Unit (NPU) including Media Access Control (MAC) and/or PHYsical layers (PHY) subsystems, and/or other networking processing systems that would be apparent to one of skill in the art in possession of the present disclosure. In the illustrated embodiment, the networking processing system 212 is coupled to each of the ports 204-208 via data couplings 213 that, as discussed below, are configured to transmit data signals and that may be provided by serializer/deserializer (serdes) connections. The chassis 202 also houses a wireless communication system 214 that is coupled to the controller processing system 210. In a specific example, the wireless communication system 214 may be provided by a BLUETOOTH® wireless communication system such as a BLUETOOTH Low Energy (BLE) wireless communication subsystem. However, while a specific wireless communication system is described, one of skill in the art in possession of the present disclosure will appreciate that other wireless communication systems (e.g., Near Field Communication (NFC) systems) will fall within the scope of the present disclosure as well. However, while a specific networking device 200 has been illustrated and described, one of skill in the art in possession of the present disclosure will recognize that networking devices provided in transceiver device port configuration and monitoring system of the present disclosure may include a variety of components and component configurations while remaining within the scope of the present disclosure as well.

Figure 3:
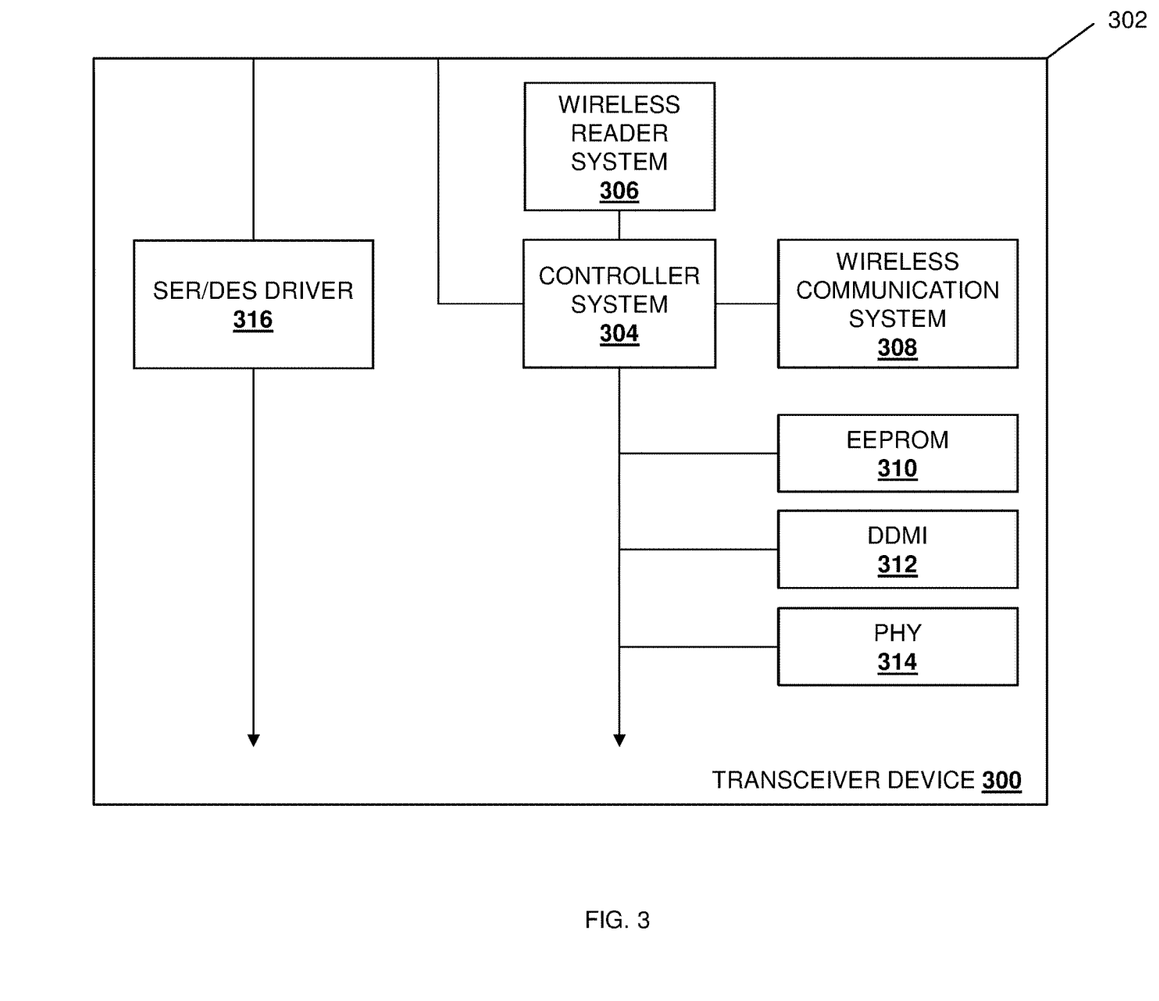
FIG. 3 is a schematic view illustrating an embodiment of a transceiver device that may be provide in the transceiver device port configuration and monitoring system of the present disclosure.

Referring now to FIG. 3, an embodiment of a transceiver device 300 is illustrated that may be provided in the transceiver device port configuration and monitoring system provided according to the teachings of the present disclosure. As such, the transceiver device 300 may be a copper-based transceiver device, an optical-based transceiver device, and/or other types of transceiver devices that would be apparent to one of skill in the art in possession of the present disclosure. In the illustrated embodiment, the transceiver device 300 includes a chassis 302 that houses the components of the transceiver device 300, only some of which are illustrated in FIG. 3. For example, the chassis 302 may house a controller system 304 that may be provided by a microcontroller and/or other controller systems known in the art. The chassis 302 also houses a wireless reader system 306 that is coupled to the controller system 304 (e.g., via a Universal Asynchronous Receiver/Transmitter (UART) connection), and that may be provided by an RFID reader, although other wireless reader systems will fall within the scope of the present disclosure as well. The chassis 302 also houses a wireless communication system 308 that is coupled to the controller system 304 (e.g., via a UART connection), and that may be provided by a BLUETOOTH® wireless communication system such as a BLUETOOTH Low Energy (BLE) wireless communication subsystem. However, while a specific wireless communication system is described, one of skill in the art in possession of the present disclosure will appreciate that other wireless communication systems (e.g., Near Field Communication (NFC) systems) will fall within the scope of the present disclosure as well.

A plurality of transceiver subsystems may be housed in the chassis 302 and, as illustrated, may include an Electronically Erasable Programmable Read Only Memory (EEPROM) 310, a Digital Diagnostic Monitoring Interface (DDMI) 312, and PHYsical (PHY) interface(s) 314, each of which are coupled to the controller system 304 (e.g., by $I_2C$ connections and/or other local connections that would be apparent to one of skill in the art in possession of the present disclosure.) However, while a few specific transceiver subsystems are illustrated and described, one of skill in the art in possession of the present disclosure will appreciate that other transceiver subsystems may be provided in the chassis 302 while remaining within the scope of the present disclosure as well. The chassis 302 also houses a ser/des driver 316 that is coupled to ser/des connections that one of skill in the art in possession of the present disclosure will recognize are configured to transmit data signals via the transceiver device 300 between devices coupled to the transceiver device 300. However, while a specific transceiver device 300 has been illustrated, one of skill in the art in possession of the present disclosure will recognize that transceiver devices (or other devices operating according to the teachings of the present disclosure in a manner similar to that described below for the transceiver device 300) may include a variety of components and/or component configurations for providing conventional transceiver device functionality, as well as the functionality discussed below, while remaining within the scope of the present disclosure as well.

Figure 4:
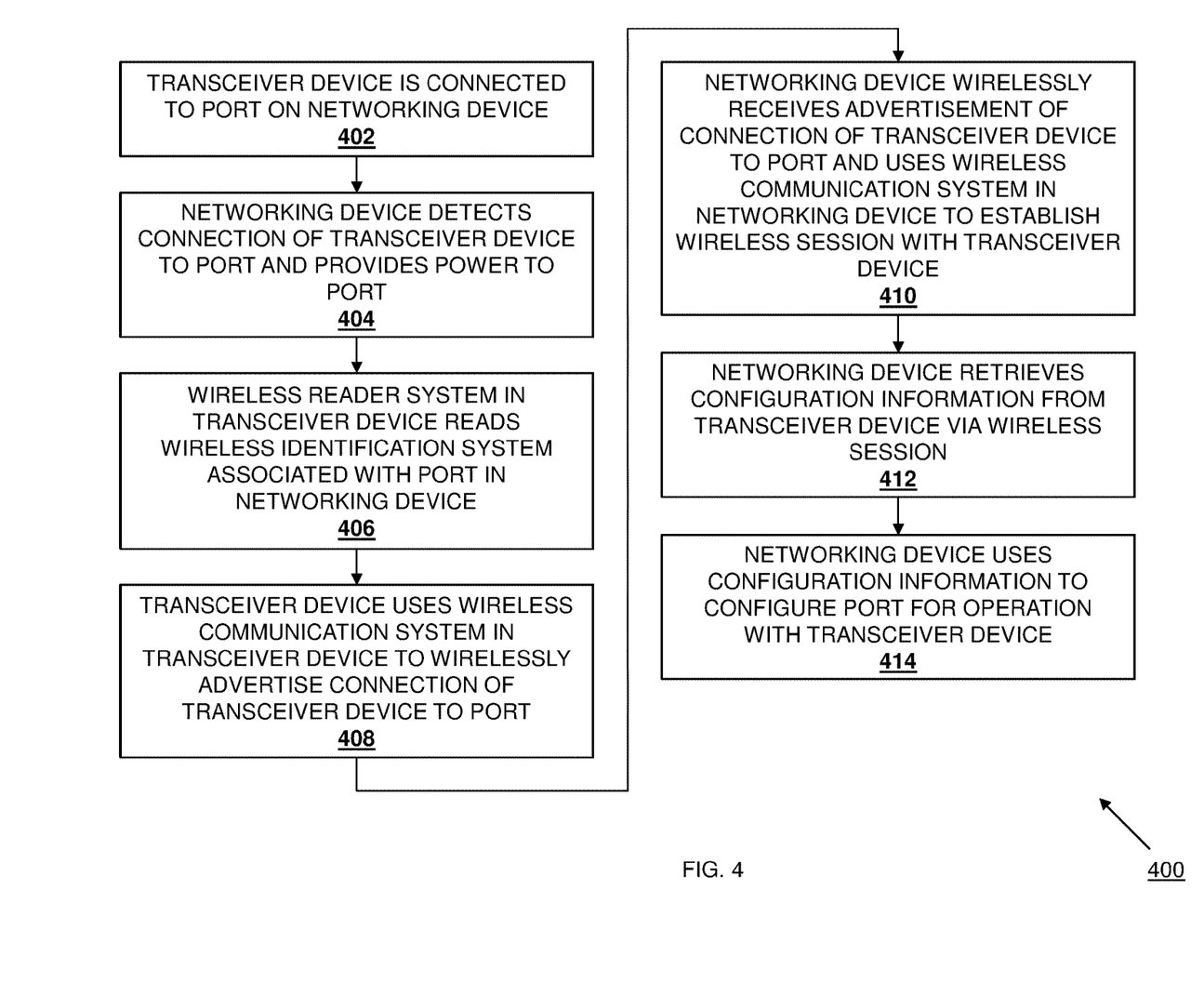
FIG. 4 is a flow chart illustrating an embodiment of a method for configuring and monitoring a transceiver device port.

Referring now to FIG. 4, an embodiment of a method 400 for configuring transceiver device ports is illustrated. As discussed below, the systems and methods of the present disclosure provide for the use of a wireless control communications by a controller processing system in a networking device in order to configure and monitor its transceiver device ports, rather than the use of $I_2C$ connections and an $I_2C$ controller that can "hang" in the event a faulty/incompatible/unqualified transceiver device is connected to the networking device. For example, the transceiver device port configuration and monitoring systems and methods of the present disclosure may include a networking device having a networking device wireless communication system, a port, and a wireless identification system associated with the port. Transceiver devices utilized in the transceiver device port configuration and monitoring system may include a wireless reader system that retrieves a port identifier for the port from the wireless identification system when the transceiver device is connected to the port, and a transceiver device wireless communication system that the transceiver device uses to wirelessly advertise the connection of the transceiver device to the port. In response to receiving the wireless advertisement of the connection of the transceiver device to the port, the networking device uses the networking device wireless communication system to establish a wireless session with the transceiver device, retrieves configuration information from the transceiver device via the wireless session, and uses the configuration information to configure the port for operation with the transceiver device (e.g., by setting port specific registers in a networking processing system and central/controller processing system), and subsequently monitor that port. As will be appreciated by one of skill in the art in possession of the present disclosure, if the transceiver device port configuration and monitoring system of the present disclosure encounters a faulty/incompatible/ unqualified transceiver device connected to the networking device during transceiver device port configuration and monitoring, it may disregard that transceiver device and configure ports coupled to other transceiver devices in the transceiver device port configuration and monitoring system, thus eliminating the manual and time consuming operations associated with finding a faulty/incompatible/unqualified transceiver device, reinitializing the $I_2C$ controller, rebooting the networking device, and/or other operations that may be required in conventional transceiver device port configuration and monitoring systems.

Figure 5A:
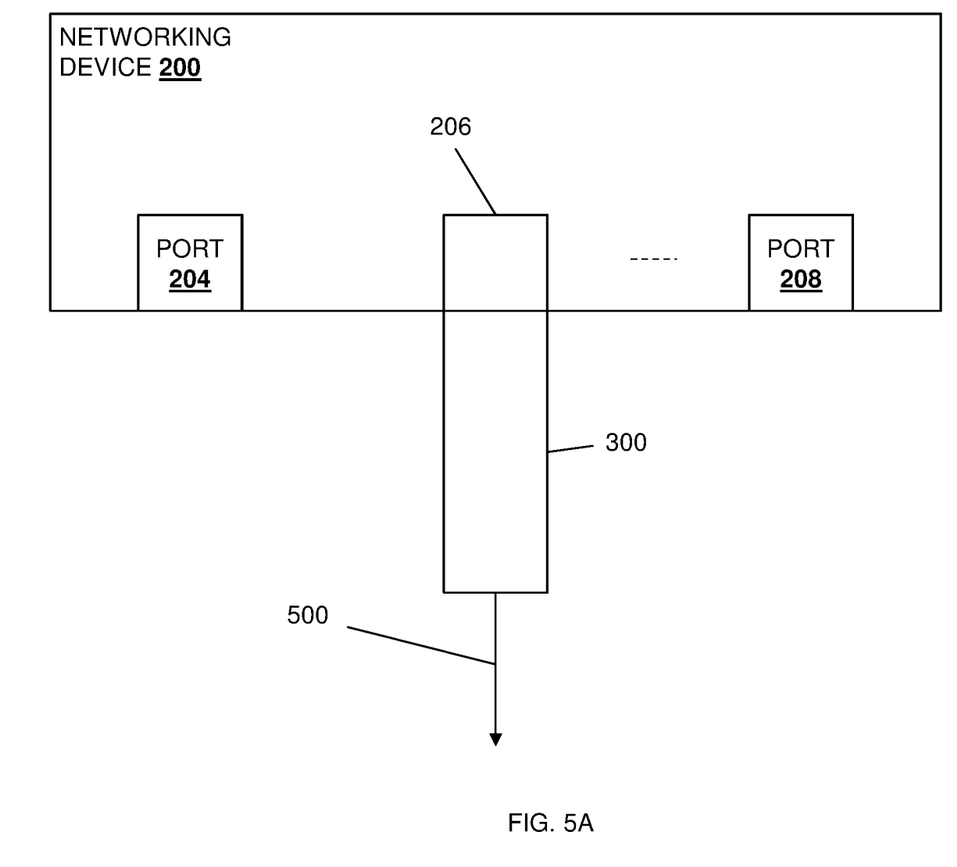
FIG. 5A is a schematic view illustrating an embodiment of a transceiver device port configuration and monitoring system with the transceiver device of FIG. 3 connected to the networking device of FIG. 2.
Figure 5B:
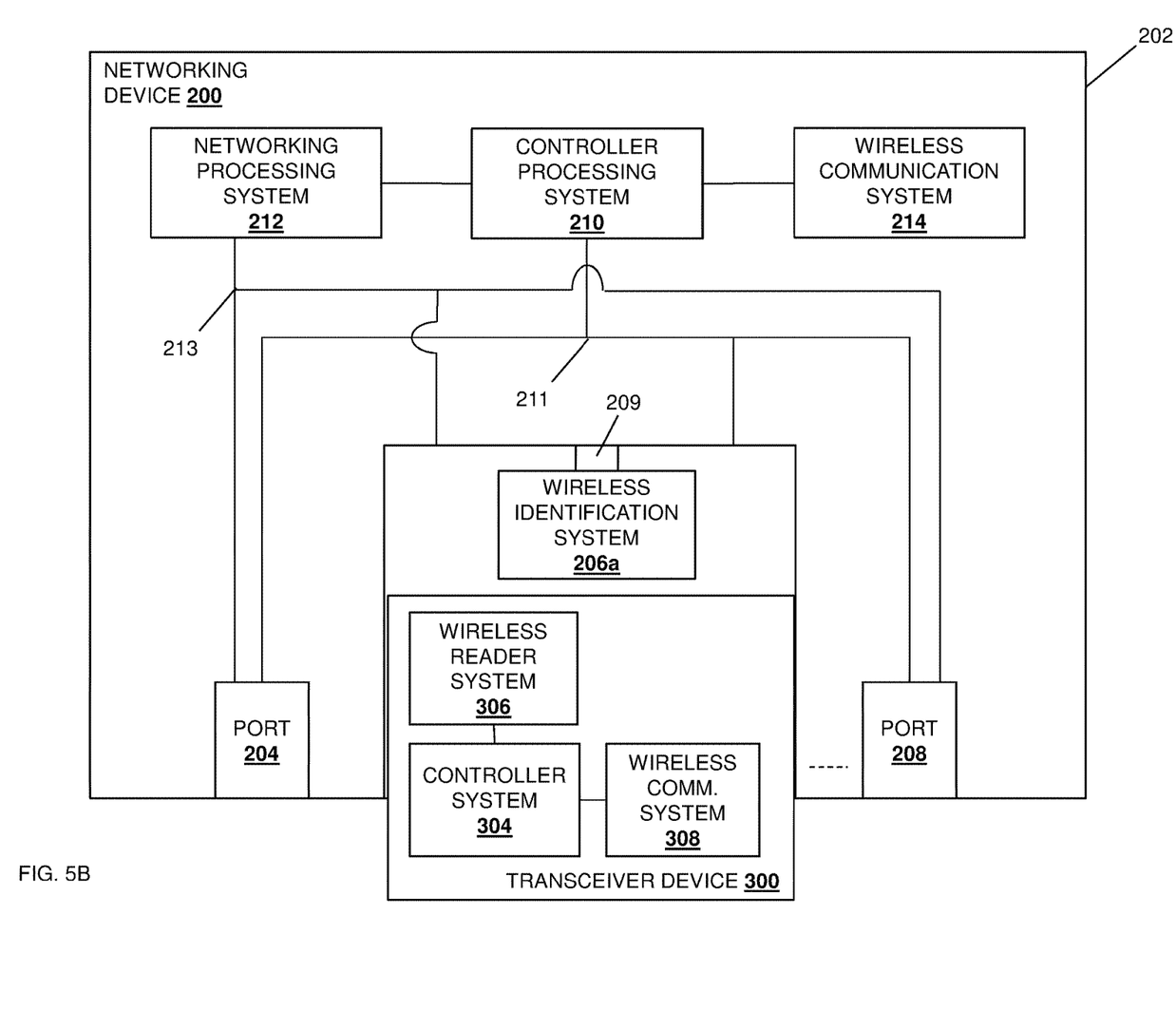
FIG. 5B is a schematic view of the transceiver device port configuration and monitoring system of FIG. 5A.

The method 400 begins at block 402 where a transceiver device is connected to a port on a networking device. With reference to FIGS. 5A and 5B, in an embodiment of block 402, the transceiver device 300 may be connected to the port 206 on the networking device 200 by engaging a connector end on the transceiver device 300 with the port 206 such that the transceiver device 300 is secured in the port 200 (e.g., via features on the transceiver device 300 and the transceiver "cage" included on the port 206.) While not illustrated, one of skill in the art in possession of the present disclosure will recognize that transceiver devices 300 may be connected to the ports 204 and up to 208 in a similar manner. As illustrated in FIG. 5A, cabling 500 may be used to couple the transceiver device 300 to any other device that would be apparent to one of skill in the art in possession of the present disclosure. With reference to FIG. 5B, the transceiver device 300 is illustrated connected to the port 206, but with some of the components of the transceiver device 300 not illustrated for clarity, and one of skill in the art in possession of the present disclosure will appreciated that the EEPROM 310, the DDMI 312, the PHY 314, the ser/des driver 316, and the connections illustrated in FIG. 3 are present in the transceiver device 300 illustrated in FIGS. 5A and 5B as well. While not discussed in detail below, one of skill in the art in possession of the present disclosure will recognize that the connection of the transceiver device 300 to the port 206 will connect the ser/des driver 316 to the networking processing system 212 via the data couplings 213 (e.g., ser/des connections) to allow for conventional data signal transmissions.

The method 400 then proceeds to block 404 where the networking device detects the connection of the transceiver device to the port and provides power to the port. In an embodiment, at block 404 and in response to the connection of the transceiver device 300 to the port 206, signals (e.g., Module Present (ModPrsL) control signals) may be generated by the transceiver device 300 and transmitted via the control couplings 211 to the controller processing system 210. In response to receiving the signals (e.g., the ModPrsL control signals) that indicate that the transceiver device 300 has been connected to the port 206, the controller engine provided by the controller processing system 210 may determine that the transceiver device 300 is connected to the port 206 and, in response, cause power to be provided by a power subsystem (not illustrated) in the networking device 200 to the port 206 in order to provide power to the transceiver device 300. As such, at block 404, the transceiver device 300 may power on and perform any transceiver initialization operations that would be apparent to one of skill in the art in possession of the present disclosure.

Figure 6:
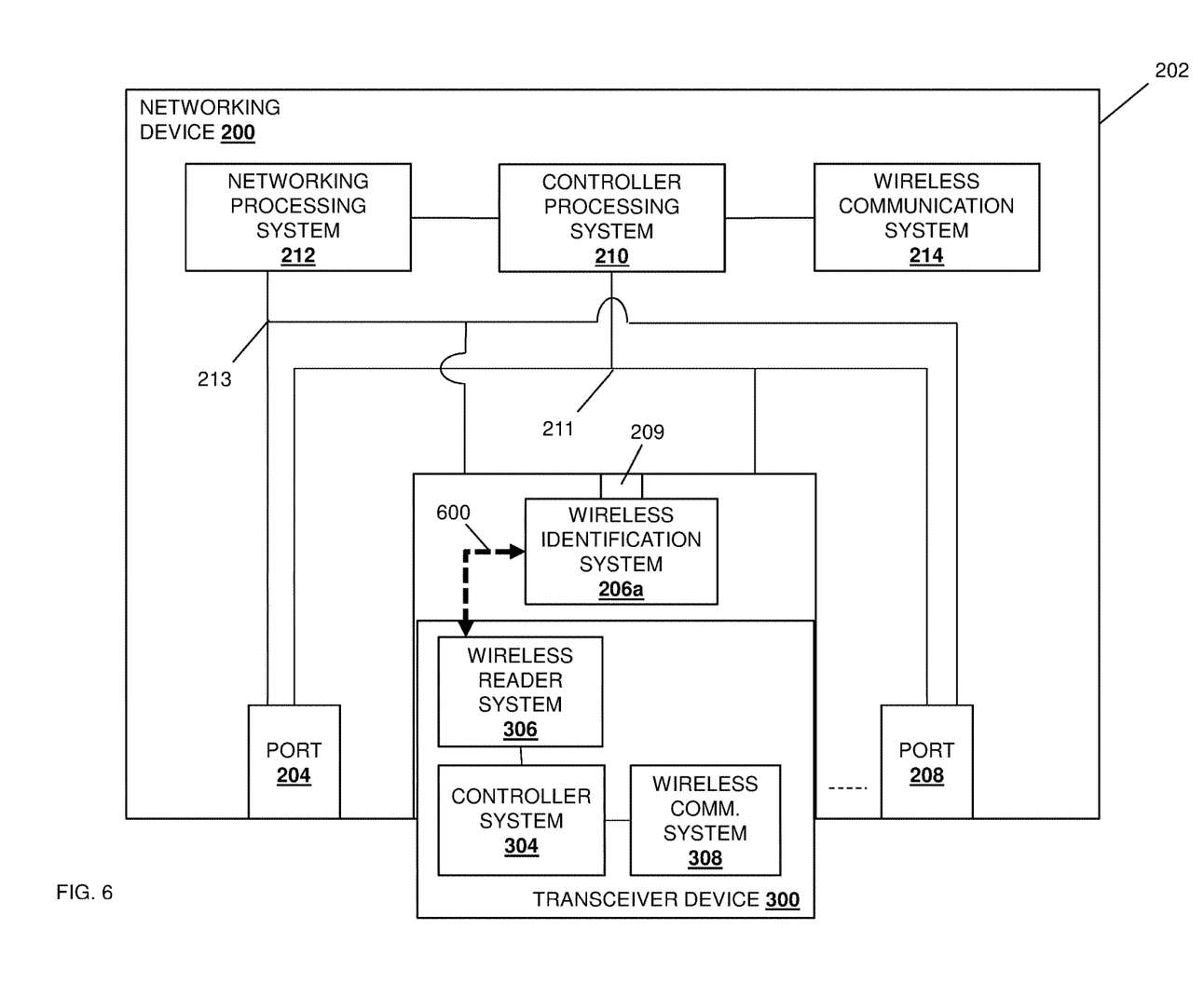
FIG. 6 is a schematic view illustrating an embodiment of the transceiver device port configuration and monitoring system of FIGS. 5A and 5B operating during the method of FIG. 4.

The method 400 then proceeds to block 406 where a wireless reader system in the transceiver device reads a wireless identification system that is associated with the port in the networking device. With reference to FIG. 6, in an embodiment of block 406, the controller system 304 in the transceiver device 300 may utilize its wireless reader system 306 to perform wireless reading operations 600 that retrieve identification information stored on the wireless identification system 206a associated with the port 206, and provide that identification information to the controller system 304. For example, at block 406, a port identifier for the port 206, a networking device identifier for the networking device 200, and/or any other information that would be apparent to one of skill in the art in possession of the present disclosure may be retrieved from the wireless identification system 206a. In a specific example, during manufacture of the networking device, the wireless identification system 206a (e.g., an RFID) associated with the port 206 may be programmed with the networking device identifier for the networking device 200 (e.g., a switch device serial identifier), the port identifier for the port 206 (e.g., a port number), and or any other information that one of skill in the art in possession of the present disclosure would recognize that providing for the functionality discussed below. As such, the connection of a transceiver device 300 to any of the ports 204, 206, and up 208a will result in that port being powered on such that the controller system 304 in that transceiver device 300 may utilize its wireless reader system 306 to retrieve identification information about the networking device 200 and the port to which it is connected from the wireless identification system associated with that port.

The method 400 then proceeds to block 408 where the transceiver device uses a wireless communication system in the transceiver device to wirelessly advertise the connection of the transceiver device to the port. With reference to FIG.

Figure 7:
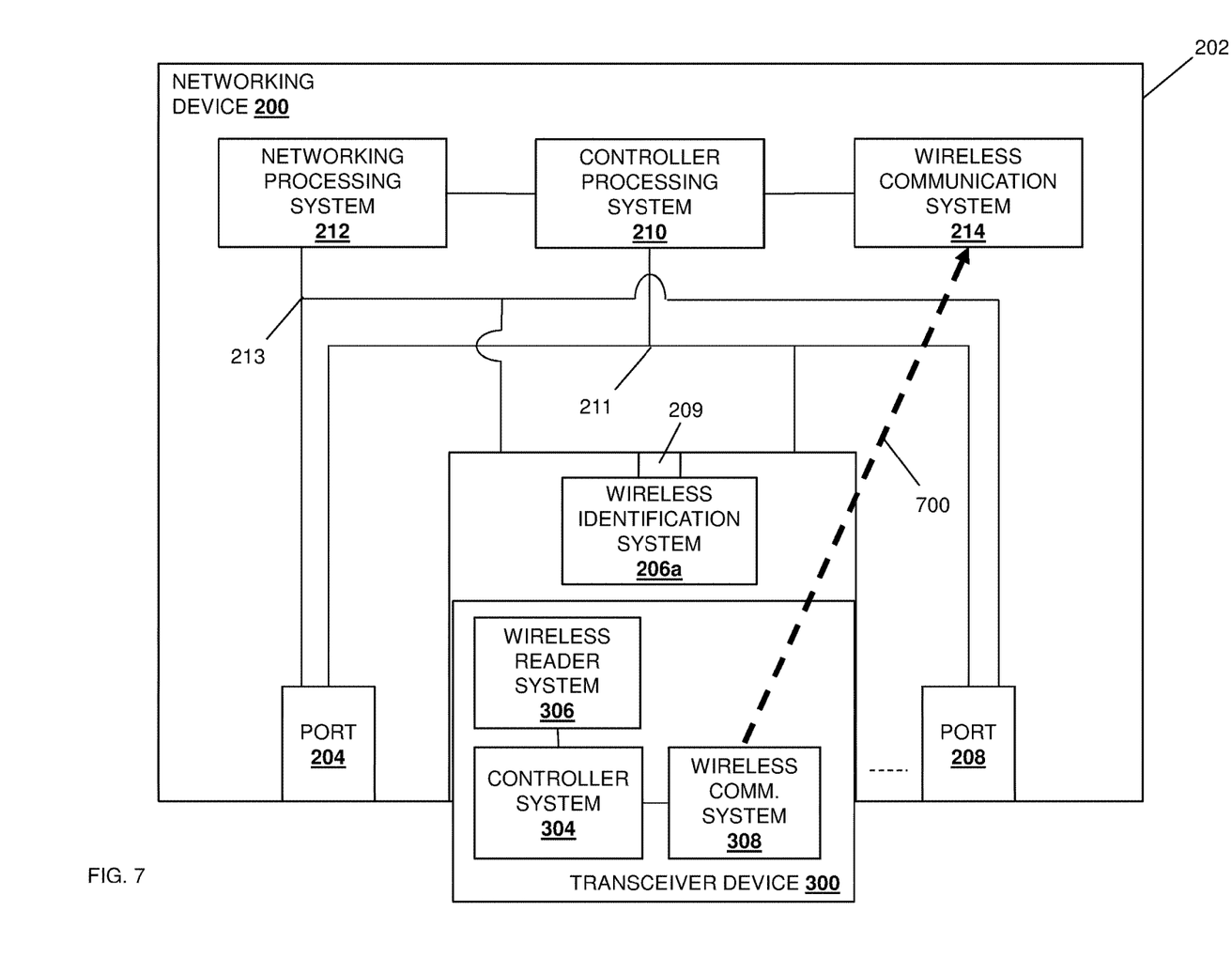
FIG. 7 is a schematic view illustrating an embodiment of the transceiver device port configuration and monitoring system of FIGS. 5A and 5B operating during the method of FIG. 4.

7, in an embodiment of block 408, the controller system 304 in the transceiver device 300 may operate to utilize its wireless communication system 308 to perform advertisement operations 700 that operate to advertise the connection of the transceiver device 300 to the port 206 by, for example, wirelessly broadcasting the port identifier for the port 206 that was retrieved from the wireless identification system 206a (as well as, in some embodiments, the networking device identifier for the networking device 200, and/or any other information) at block 406. Continuing with the specific example provided above, the wireless communication system 308 in the transceiver device 300 may be provided by a BLUETOOTH® wireless communication system (e.g., a BLE wireless communication system), and at block 408 may utilize BLUETOOTH® techniques known in the art to perform the advertisement operations 700. However, while a specific wireless technology has been described, one of skill in the art in possession of the present disclosure will appreciate that the advertisement operations 700 may be performed using a variety of technologies while remaining within the scope of the present disclosure as well.

Figure 8:
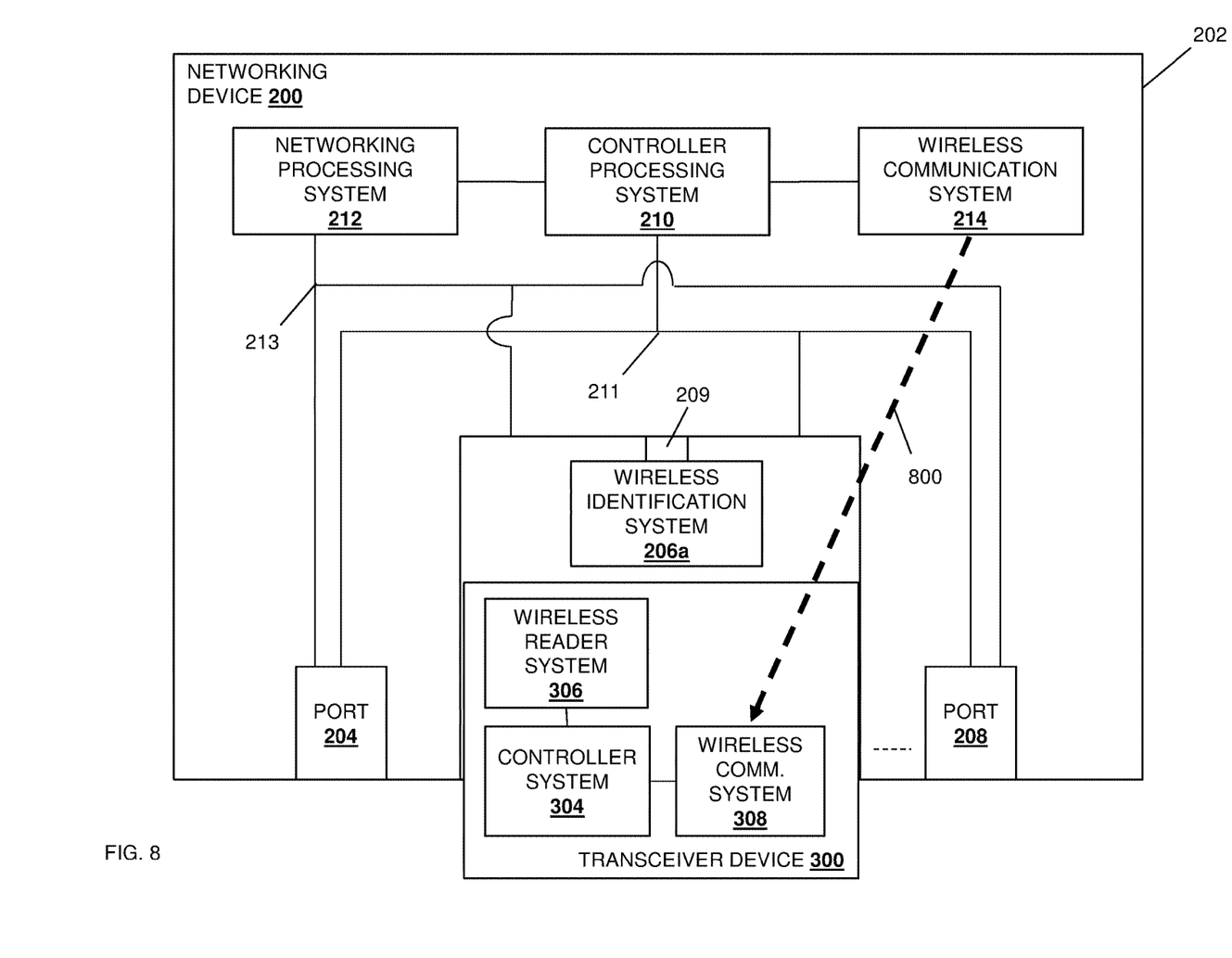
FIG. 8 is a schematic view illustrating an embodiment of the transceiver device port configuration and monitoring system of FIGS. 5A and 5B operating during the method of FIG. 4.

The method 400 then proceeds to block 410 where the networking device wirelessly receives the advertisement of the connection of the transceiver device to the port and uses a wireless communication system in the networking device to establish a wireless session with the transceiver device. As illustrated in FIG. 7, in an embodiment of block 410, the controller engine provided by the controller processing system 210 may utilize the wireless communication system 214 in the networking device 200 to receive the advertisement(s) provided via the advertisement operations 700 by the wireless communication system 308 in the transceiver device 300 and, in response, may utilize the wireless communication system 214 in the networking device 200 to establish a wireless session with the transceiver device 300 via its wireless communication system 308. Continuing with the specific example provided above, the wireless communication systems 214 and 308 may be provided by BLUETOOTH® wireless communication systems (e.g., a BLE wireless communication system), and at block 410 the wireless communication system 214 in the networking device 200 may utilize BLUETOOTH® techniques known in the art to operate as a BLE master device, the wireless communication system 308 in the transceiver device 300 may utilize BLUETOOTH® techniques known in the art to operate as a BLE slave device, and one of skill in the art in possession of the present disclosure will appreciated how a BLE master device and a BLE slave device may establish a wireless session (e.g., a BLE wireless session). However, while a specific wireless technology has been described, one of skill in the art in possession of the present disclosure will appreciate that the wireless session may be established at block 410 using a variety of technologies while remaining within the scope of the present disclosure as well The method 400 then proceeds to block 412 where the networking device retrieves configuration information from the transceiver device via the wireless session. As illustrated in FIG. 8, in an embodiment of block 412 and in response to establishing the wireless session (e.g., the BLE wireless session discussed above) at block 410, the controller engine provided by the controller processing system 210 may utilize the wireless communication system 214 in the networking device 200 to perform retrieval operations 800 in order to retrieve configuration information from the transceiver device 300. For example, with reference to FIG. 8 as well as FIG. 3, the retrieval operations 800 may include the controller engine provided by the controller processing system 210 in the networking device 200 utilizing its wireless communication system 214 to communicate with the controller system 304 in the transceiver device 300 via its wireless communication system 308 in order to cause the controller system 304 to retrieve configuration information from the EEPROM 310 (as well as from other subsystems in the transceiver device 300 such as the DDMI 312 and the PHY 314), and transmit that configuration information via its wireless communication system 308 to the wireless communication system 214 in the networking device 200 such that that configuration information is received by the controller processing system 210.

Furthermore, in some embodiments, the retrieval operations 800 may be accompanied by provisioning operations that include the controller processing system 210 utilizing the wireless communication system 214 in the networking device 200 to provide configuration information on the transceiver device 300. For example, with reference to FIG. 8 as well as FIG. 3, the provisioning operations may include the controller engine provided by the controller processing system 210 in the networking device 200 utilizing its wireless communication system 214 to communicate with the controller system 304 in the transceiver device 300 via its wireless communication system 308 in order to cause the controller system 304 to write configuration information to the EEPROM 310 and/or other registers in the transceiver device 300, as well as providing configurations for other subsystems in the transceiver device 300 such as the DDMI 312 and the PHY 314.

Figure 9:
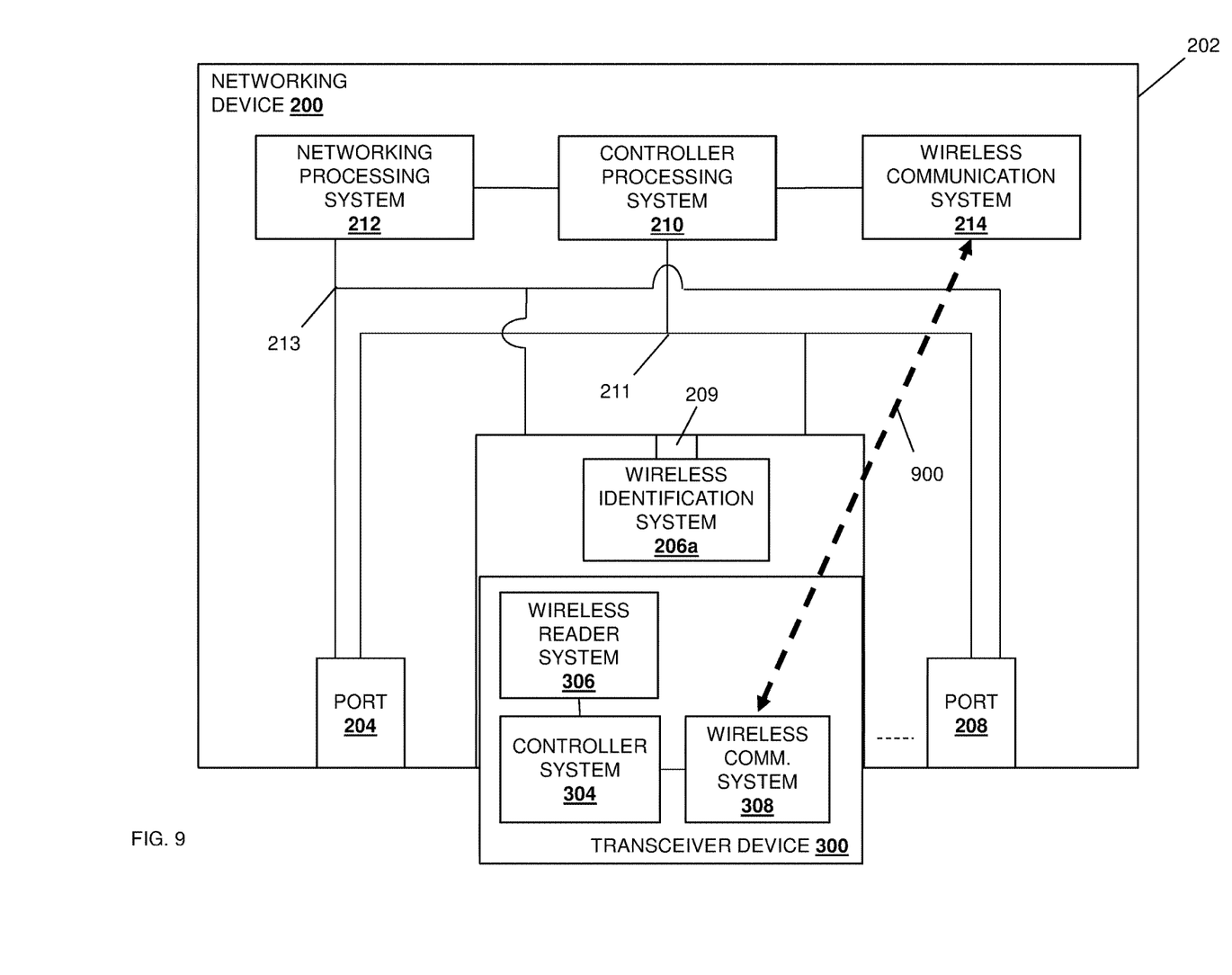
FIG. 9 is a schematic view illustrating an embodiment of the transceiver device port configuration and monitoring system of FIGS. 5A and 5B operating during the method of FIG. 4.

Further still, in some embodiments and as illustrated in FIG. 9, the controller engine provided by the controller processing system 210 may utilize the wireless communication system 214 in the networking device 200 to perform monitoring operations 900 in order to retrieve status information (e.g., temperature information, power information, voltage information, external PHY information, and/or other status information that would be apparent to one of skill in the art in possession of the present disclosure) from the transceiver device 300. For example, the monitoring operations 900 may include the controller processing system 210 transmitting a read command that provides for the reading of status information from the transceiver device 300 using the wireless communication system 214, the transceiver device 300 providing response data using the wireless communication system 308, and/or any other monitoring operations that would be apparent to one of skill in the art in possession of the present disclosure.

The method 400 then proceeds to block 414 where the networking device uses the configuration information to configure the port for operation with the transceiver. In an embodiment, at block 414, the controller engine provided by the controller processing system 210 in the networking device 200 may then utilize the configuration information retrieved at block 412 from the transceiver device 300 connected to the port 206 in order to configure the port 206 for operation with that transceiver device 300 (e.g., to provide Forward Error Correction (FEC) configurations for the port, and/or other port configurations that would be apparent to one of skill in the art in possession of the present disclosure.) One of skill in the art in possession of the present disclosure will recognize that a wide variety of conventional configuration operations may be performed on ports using configuration information retrieved from an EEPROM in a transceiver device 300, and thus those configuration operations are not described in detail herein. Thus, following block 414, the port 206 may be configured to operate with the transceiver device 300, and data signals may be transmitted via the transceiver device 300 using conventional techniques that would be apparent to one of skill in the art in possession of the present disclosure.

Thus, systems and methods have been described that provide for the use of a BLE wireless control communications by a controller processing system to configure a transceiver device port, rather than the use of I2C connections and an I2C controller that can "hang" in the event a faulty/incompatible/unqualified transceiver device is encountered. For example, the transceiver device port configuration and monitoring systems and methods of the present disclosure may include a switch device having a BLE wireless communication system, a port, and a RFID associated with the port. Transceiver devices utilized in the transceiver device port configuration and monitoring system may include an RFID reader system that retrieves a port identifier for the port from the RFID when the transceiver device is connected to the port, and a BLE wireless communication system that the transceiver device uses to wirelessly advertise the connection of the transceiver device to the port. In response to receiving the wireless advertisement of the connection of the transceiver device to the port, the switch device uses the BLE wireless communication system to establish a BLE wireless session with the transceiver device, retrieves configuration information from the transceiver device via the BLE wireless session, and uses the configuration information to configure the port for operation with the transceiver device. As will be appreciated by one of skill in the art in possession of the present disclosure, if the transceiver device port configuration and monitoring system of the present disclosure encounters a faulty/incompatible/unqualified transceiver device, it may disregard that transceiver device and configure ports coupled to other transceiver devices in the transceiver device port configuration and monitoring system, thus eliminating the manual and time consuming operations associated with finding a faulty/incompatible/unqualified transceiver device, reinitializing the 120 controller, rebooting the switch device, and/or other operations that are required in conventional transceiver device port configuration and monitoring systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A transceiver device port configuration and monitoring system, comprising:
 a networking device that includes a networking device wireless communication system, a port, and a wireless identification system associated with the port; and
 a transceiver device that includes a transceiver device chassis, a wireless reader system that is configured to wirelessly retrieve a port identifier for the port from the wireless identification system when the transceiver device chassis is physically connected to the port, and a transceiver device wireless communication system that the transceiver device is configured to use to wirelessly transmit the port identifier for the port in order to provide an advertisement of the connection of the transceiver device chassis to the port, wherein the networking device is configured to:
 use, in response to wirelessly receiving the port identifier that provides the advertisement of the connection of the transceiver device chassis to the port, the networking device wireless communication system to establish a wireless session with the transceiver device;
 retrieve, via the wireless session, configuration information from the transceiver device; and
 configure, using the configuration information, the port for operation with the transceiver device.

2. The system of claim 1, wherein the networking device is configured to:
 detect a physical connection of the transceiver device chassis to the port and, in response, provide power to the port.

3. The system of claim 1, wherein the wireless reader system is configured to retrieve a networking device identifier for the networking device from the wireless identification system when the transceiver device chassis is physically connected to the port.

4. The system of claim 1, wherein wireless identification system includes a mechanical connection to the networking device, and a release mechanism that is configured to be actuated to release the wireless identification system from the networking device.

5. The system of claim 1, wherein the networking device is configured to:
 provide, via the wireless session, configuration information on the transceiver device.

6. The system of claim 1, wherein the configuration of the port includes providing at least one Forward Error Correction configuration for the port.

7. An Information Handling System (IHS), comprising:
 a port;
 a wireless identification system that is associated with the port and that is configured to provide for wireless retrieval of a port identifier for the port;
 a processing system; and
 a memory system that is coupled to the processing system and that includes instructions that, when executed by the processing system, cause the processing system to provide a controller engine that is configured to:
 wirelessly receive, via a wireless communication system from a transceiver device that includes a transceiver device chassis and that has been physically connected to the port, the port identifier that was retrieved wirelessly from the wireless identification system by the transceiver device, and that provides an advertisement of a physical connection of the transceiver device chassis to a port that is coupled to the processing system;
 use, in response to receiving the wireless advertisement of the physical connection of the transceiver device chassis to the port that is coupled to the processing system, the wireless communication system to establish a wireless session with the transceiver device;
 retrieve, via the wireless session, configuration information from the transceiver device; and
 configure, using the configuration information, the port for operation with the transceiver device.

8. The IHS of claim 7, wherein the controller engine is configured to:
 detect a physical connection of the transceiver device chassis to the port and, in response, provide power to the port.

9. The IHS of claim 7, further comprising:
a wireless identification system is configured to wirelessly provide a port identifier for the port to the transceiver device when the transceiver device chassis is physically connected to the port.

10. The IHS of claim 9, wherein wireless identification system includes a mechanical connection to the IHS, and a release mechanism that is configured to be actuated to release the wireless identification system from the IHS.

11. The IHS of claim 7, wherein the controller engine is configured to:
provide, via the wireless session, configuration information on the transceiver device.

12. The IHS of claim 11, wherein the providing the configuration information on the transceiver device includes providing a setting on at least one subsystem in the transceiver device.

13. The IHS of claim 7, wherein the configuration of the port includes providing at least one Forward Error Correction configuration for the port.

14. A method for configuring and monitoring a transceiver device port, comprising:
wirelessly receiving, by a networking device via a wireless communication system from a transceiver device that includes a transceiver device chassis and that has been physically connected to a port coupled to the processing system, a port identifier that was retrieved wirelessly by the transceiver device from a wireless identification system associated with the port, and that provides an advertisement of a physical connection of the transceiver device chassis to the port;
using, by the networking device in response to receiving the port identifier that provides the advertisement of the physical connection of the transceiver device chassis to the port, the wireless communication system to establish a wireless session with the transceiver device;
retrieving, by the networking device via the wireless session, configuration information from the transceiver device; and
configuring, by the networking device using the configuration information, the port for operation with the transceiver device.

15. The method of claim 14, further comprising:
detecting, by the networking device, a physical connection of the transceiver device chassis to the port and, in response, providing power to the port.

16. The method of claim 14, further comprising:
wirelessly providing, by a wireless identification system included in the networking device, a port identifier for the port to the transceiver device when the transceiver device chassis is physically connected to the port.

17. The method of claim 16, further comprising:
releasing, by a release mechanism that is part of a mechanical connection between the wireless identification system and the networking device, the wireless identification system from the networking device.

18. The method of claim 14, further comprising:
providing, by the networking device via the wireless session, configuration information on the transceiver device.

19. The method of claim 18, wherein the providing the configuration information on the transceiver device includes providing a setting on at least one subsystem in the transceiver device.

20. The method of claim 14, wherein the configuration of the port includes providing at least one Forward Error Correction configuration for the port.

* * * * *